Patented June 9, 1931

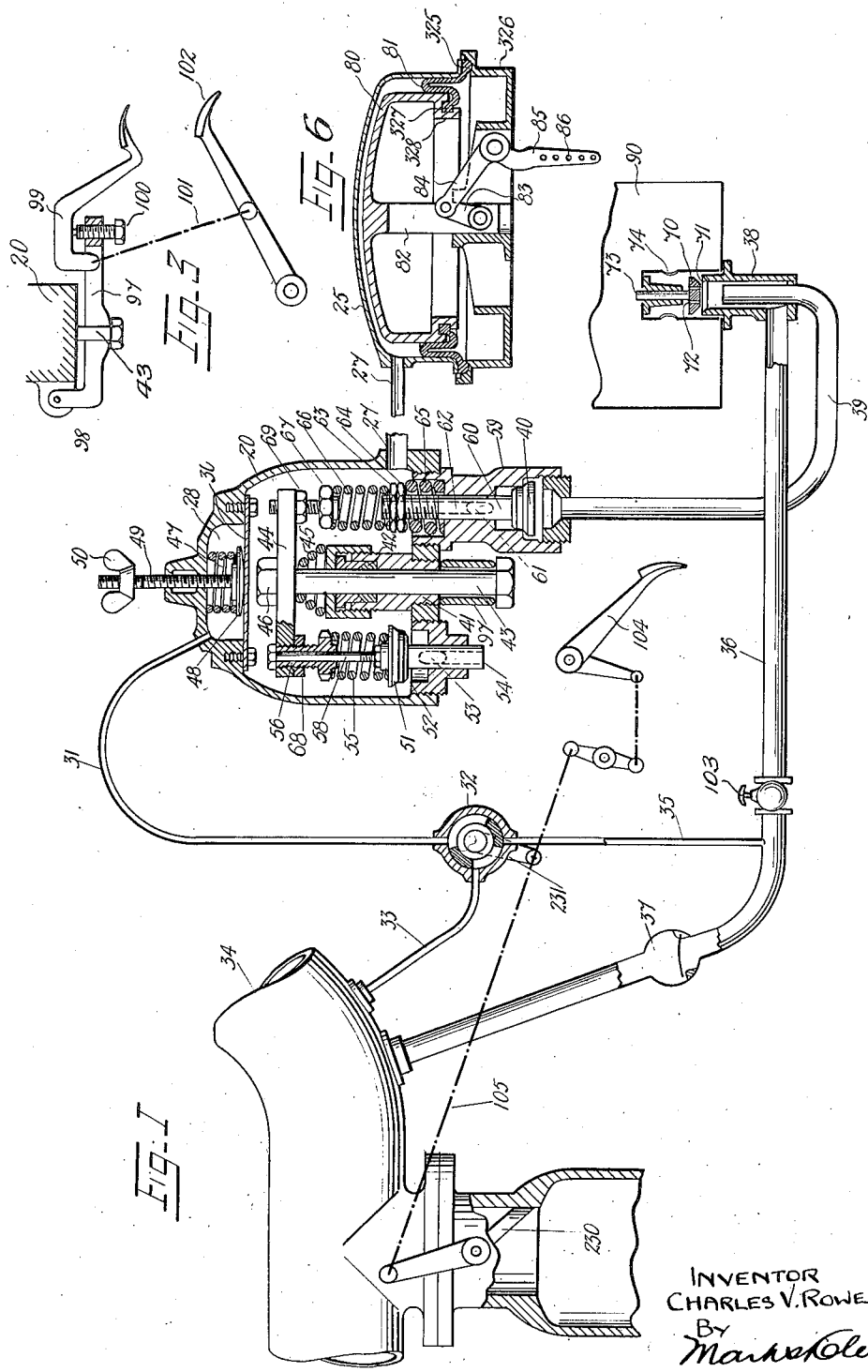

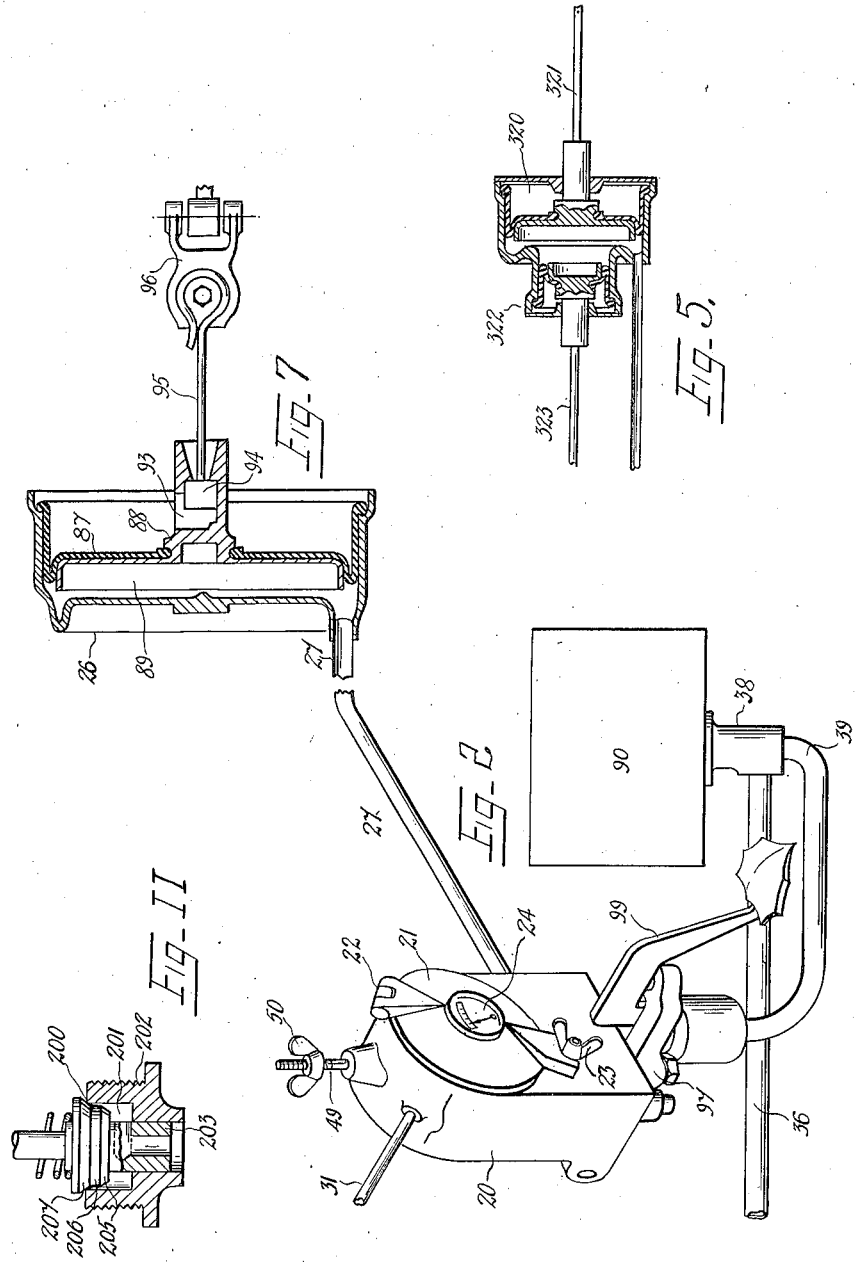

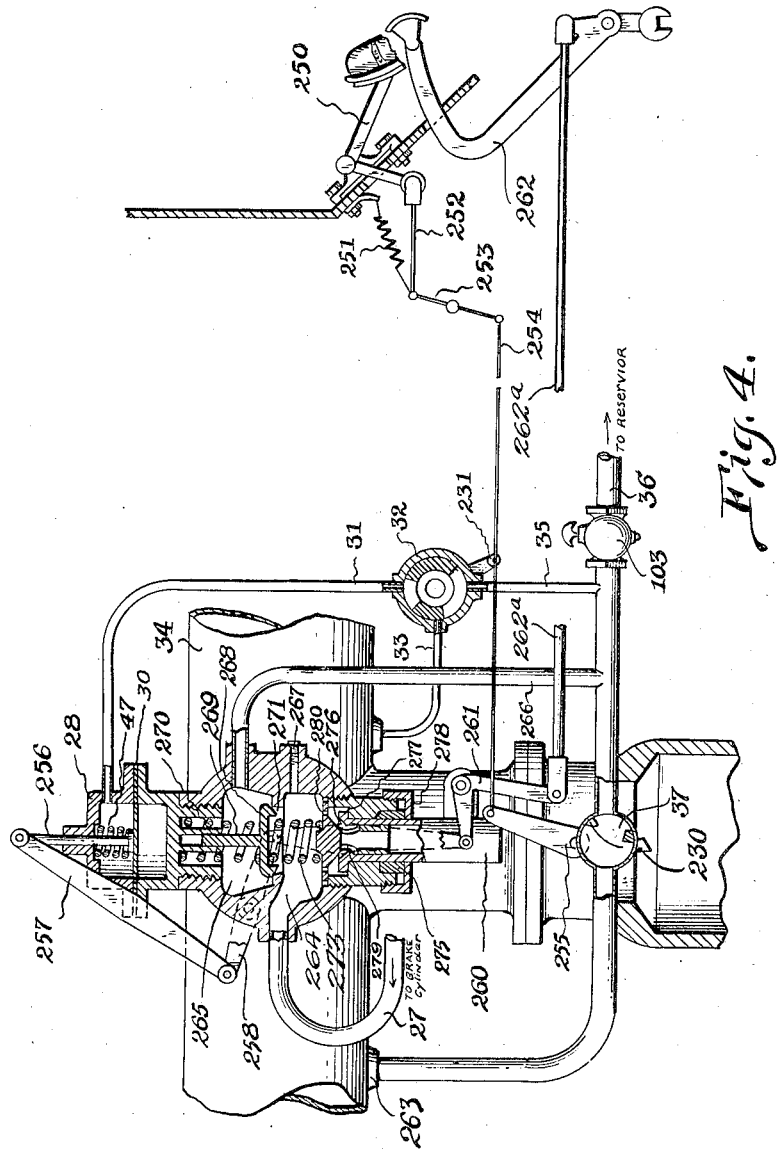

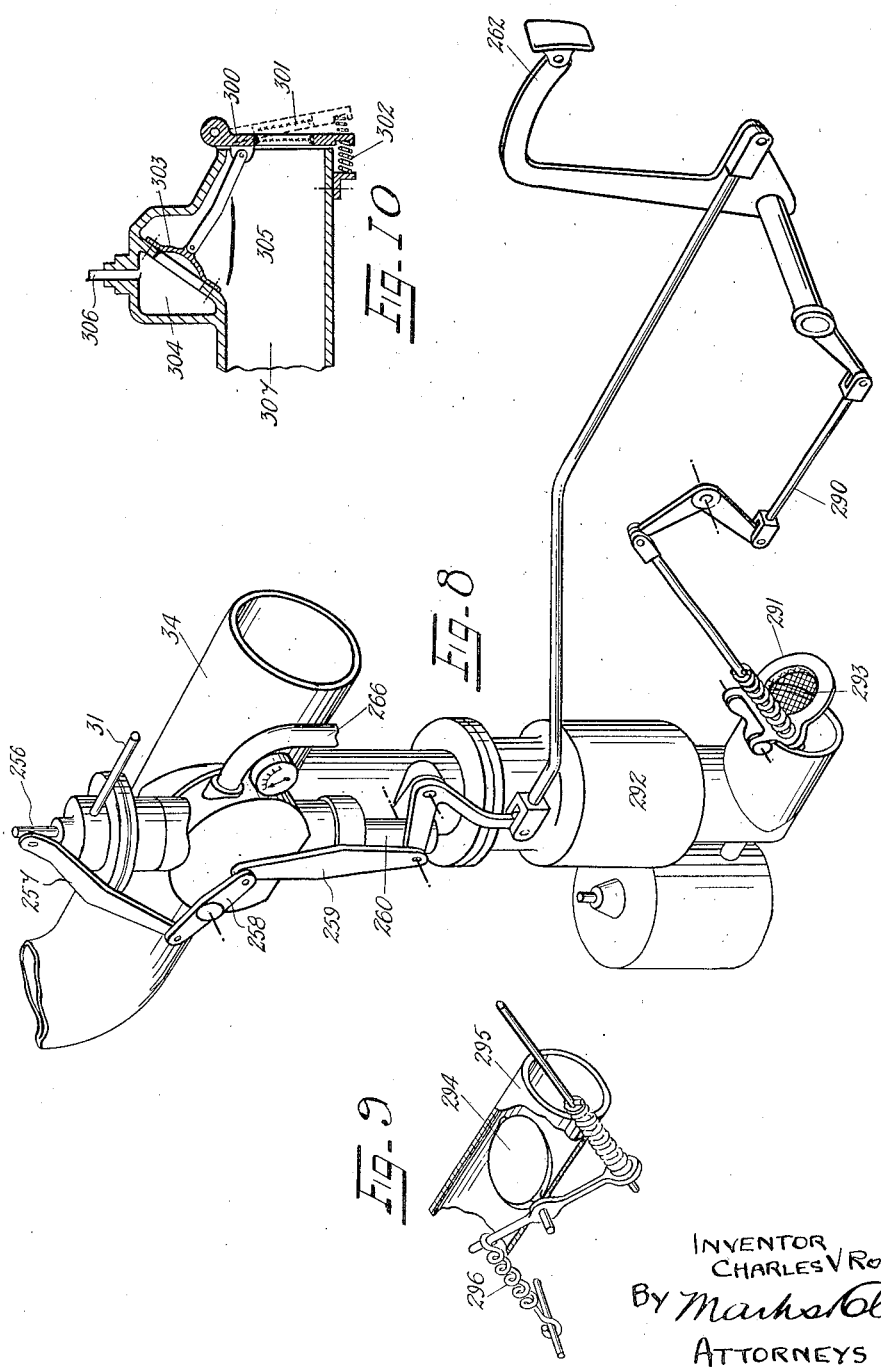

1,809,491

UNITED STATES PATENT OFFICE

CHARLES VICTOR ROWELL, OF McMAHONS POINT, NEAR SYDNEY, NEW SOUTH WALES, AUSTRALIA

VACUUM BRAKE

Application filed May 3, 1927, Serial No. 188,581, and in Australia May 3, 1926.

This invention relates to motor road vehicle brakes in which engine suction is utilized under control of the driver to permit atmospheric pressure to act against a piston and apply and hold the brakes of the vehicles. The equipment is fitted either as auxiliary to other brake equipment, preferably utilizing the same brake shoes, or otherwise is fitted in place of other brake equipment, and in the latter case is relied on solely for operating the brake shoes. In the former case the existing controls are retained and the auxiliary controls are operatable independently of them.

Evacuation of air from the rear side of the piston is limited automatically obediently to the operation of the driver's controls and irrespective of the degree of depression in the manifold for the time being.

The apparatus in which the invention is concerned will now be described with reference to the accompanying four sheets of drawings:—

Fig. 1 is a sectional elevational view illustrating one type of the apparatus;

Fig. 2 is a semi-perspective view of the various parts of the apparatus;

Fig. 3 is a detail fragmentary view of portion of the pedal control means through which the brake is operated;

Fig. 4 is an elevational view of another type of device in which a simplified form of control valve is used, portions of the device being broken away and shown in section;

Fig. 5 is a fragmentary sectional view of a double end brake cylinder arranged for simultaneous operation of rear wheel brakes and fore wheel brakes;

Fig. 6 is a transverse section through a brake cylinder for operating the brakes in a plane at right angles to the cylinder axis;

Fig. 7 is a similar view explanatory of the brake cylinder arrangement for a straight pull on a single brake rod;

Fig. 8 is a perspective view of the equipment with a choke linked to the brake lever to effect thickening of the fuel mixture in order to prevent stalling of the engine when air is evacuated from the brake cylinder to the manifold consequent on application of the brake;

Fig. 9 is an alternative detail of the choke valve shown in Fig. 8;

Fig. 10 is a detail of an automatic choke device having the same purpose as the choke arrangement shown in Fig. 8; and Fig. 11 is a fragmentary sectional view of the atmospheric valve and its seating.

Referring to Figs. 1, 2, and 3, it will be noted that the brake cylinder in Fig. 1 is arranged in correspondence with Fig. 6, and that the brake cylinder in Fig. 2 is arranged in correspondence with Fig. 7; these arrangements are interchangeable to adapt the equipment for different vehicles according to the available space under floors and the arrangement of the brake rigging.

The control valve is contained in a casing 20 which is fitted with a door 21 carried on a hinge 22 and secured by a dog screw 23. The cover 21 is gasketed so that when it is closed it will hold pressure within the casing 20. 24 is a vacuum gauge for indicating the pressure within the casing 20. The valve parts shown in Fig. 1 are fitted within the casing 20 and the casing is connected to the brake cylinder 25 or to the brake cylinder 26 as the case may be through a pipe 27. An upper chamber 28 in the casing 20, divided from the lower chamber in that casing by a flexible diaphragm 30, is connected by a pipe 31 to the casing of a three-way valve 32; that casing is also connected by a pipe 33 to the inlet manifold 34 of the engine and through a by-pass pipe 35 to a connector pipe 36 which leads through a non-return valve 37 from the manifold 34 to the casing 38 of the foot valve in a vacuum chamber 90. The pipe 39 from the vacuum valve 40 connects into the casing 38.

41 is a slide bearing with gland packing 42. It is fitted in the bottom of the casing 20 and through it slides a rod 43 which is armed with a yoke 44 on the head of it, 45 being a helical spring in compression supporting the yoke 44 and holding the rod 43 upward. The yoke 44 carries a valve at either end of it, and a nut 46 on the top of it contacts with the underside of the diaphragm 30. 47 is a helical spring in compression contained in the chamber 28 and bearing down on a plunger shoe 48 which sets on the top of the diaphragm 30. The plunger stem 49 extending upward from the shoe 48 passes out through the top of the chamber 28 and a wing nut 50 is fitted on it for the purpose of adjusting the downward limit position of the shoe 48. The spring 47 in certain circumstances, which will be hereinafter explained, permits the diaphragm 30 to rise.

The atmospheric valve 51 is a mitre faced metal poppet valve co-acting with a seating 52, clearance under the seat being open to atmosphere through a lateral port 53 and a tubular hole 54. The details of the atmospheric valve 51 and the vacuum valve 40 and their seatings are important. The detail is the same for both valves and is shown in the fragmentary view, Fig. 11. The seating 200 is a sharp edge on the top end of the cylindrical cavity 201 in the member 202 through which the valve stem 203 is freely slidable. The bottom end of the valve head is chamfered as shown at 205 to ensure entry of the valve body into the cylindrical cavity 201. The valve body portion 206 is cylindrical and an easy fit for the cavity 201; it guides the valve to true seating position. The valve has a mitre face 207 which makes a close joint with the circular seating edge 200, in the closed position of the valve. When the valve is moving between the full closed and full open position, the free clearance around its cylindrical body portion 206 permits air to "bleed" past the seat at a slow rate. An undesirably rapid change in the application and release of the brake is thus provided against. When the valve 51 is raised, the interior of the casing 20 is in communication with atmosphere through the hole 54, the port 53, and the clearance space under the seating 52. 55 is a helical spring in compression bearing down on the valve 51 and taking its abutment against an adjustable stud 56 fixed in one end of the yoke 44. The valve is free to rise against the spring 55 when the spring is compressed, inasmuch as the valve spindle 58 is slidable through the central hole in the stud 56. The vacuum valve 40 is a mitre faced poppet valve of similar construction which closes upwardly against its seat in the casing 59. The stem portion 60 of this valve is ported laterally as shown at 61 and the lateral port is extended through a central hole 62 to the top of the stem 60. When the valve 40 is moved down off its seat a connection is opened between the foot valve casing 38 of the vacuum chamber 90 and the interior of the chamber 20 through the pipe 39 and the clearance around the seating in the casing 59, the lateral port 61, and the central hole 62. 63 and 64 are adjusting abutment nuts screwed on the valve stem 60. 65 is a helical spring in compression under the nut 64 and taking its abutment against the bottom of the casing 20, or, as shown, in a seating in the casing 59 which is screwed up into the casing 20, and 66 is a helical spring in compression bearing down on the nut 63 and taking its abutment against the head of an adjusting stud 67 which is carried in one end of the yoke 44. 68 and 69 are locking nuts; the nuts 63 and 64 lock each other.

90 is a vacuum chamber or "reservoir" into which air is evacuated from the brake cylinders to operate the brakes whilst the engine is at rest or is working under conditions of small vacuum in the manifold. Air is exhausted from this chamber whilst the engine is in operation. The foot valve casing 38 is connected to the valve casing 59 by the pipe 39 and it is connected by the pipe 36 through the check valve 37 to the engine manifold 34. The top end of the foot valve casing 38 within the chamber 90 is formed as a seat 71 to carry the self-closing poppet valve 70. The stem of this valve is slidable through a guide 73 and the assembly is contained in a protecting case 74 which is ported laterally. 72 are air bleeder holes through the valve 70; these holes are of very small dimensions. This provision avoids risk of stalling of the engine by passing air at a fast rate from the reservoir 90 to the mixture in the manifold. When the brakes are operated, the air educted from the brake cylinders passes into the chamber 90 through the pipe 39, the valve 70 being free to lift to permit air to enter. The chamber 90 is exhausted of the air which flows into it by the continuous suction applied to it from the manifold intermediate and during operation of the brakes, the valve 70 being seated during this period of evacuation.

The cylinder 25 (see Fig. 6) contains a piston 80 connected with the wall by an annular intussuscepting rubber ring 81, certain details of which will be referred to later. The centre portion 82 of the piston is pivotally connected through an articulated link 83 to the power end 84 of a pull lever, the load end 85 of which is connected to the brake linkage through one or other of the pivot link holes 86, a number of these holes being provided to facilitate adjustment for throw and intensity of pull. The pipe 27 is connected into the closed end of the cylinder above the piston 80. The other side of the piston is exposed to atmosphere.

In the direct pull type of brake cylinder the construction is substantially similar, 87 being the intussuscepting rubber member which in this case is a disc having a central hole which is sprung over the circular stem portion 88 of the piston 89. The rear portion of the stem 88 is formed with a pocket 93 to detachably carry the pull head 94 of a trace rod 95 which is connected to the brake linkage member 96.

The bottom end of the stem rod 43 which carries the yoke 44 is embraced by a fork 97 which is movable on a pivot pin 98 at the back of the casing 20. The forward end of this fork 97 projects forwardly and is fitted with a pedal 99 having a positioning adjustment screw 100 for locating it at a conveniently operative angle for the convenience of the driver's foot. 101 is a flexible pull linkage from the fork 97 to the foot brake pedal 102 by which the mechanical or other brake system of the car is operable. If the pedal 102 be depressed, the ordinary brake mechanism is operated and the air brake mechanism is simultaneously operated. If, however, the pedal 99 be depressed, then only the air brake mechanism is controlled the linkage 101 permitting this to occur. The linkage 101 may be detachable to liberate the air brake equipment when it is desired to use only the ordinary foot brake. A valve 103 may be fitted at any convenient place in the pipe line to connect up and to disconnect the air brake from the engine manifold, as required.

With the air brake inoperative, the air valve 51 is open and the vacuum valve 40 is closed. When either of the brake pedals 99—102 is depressed, the yoke 44 is moved downward; in the downward movement it first forces the atmospheric valve 51 on to its seat, and compresses the compensating spring 66 which acts on the vacuum valve 40. The spring 55 permits the yoke 44 to continue its downward movement after the atmospheric valve 51 is seated. If this downward movement be continued until the load on the spring 66 counterbalances the opposite loading due to the tension on the spring 65 added to the suction effect acting behind the valve 40 and tending to open it, the valve 40 opens, and places the brake cylinder in communication with exhaust through the pipe line 39. Air is then evacuated from the brake cylinder 25 (or 26) through the pipe 27, the valve casing 20, the vacuum valve 40, the pipe 39, and, if the engine be running, the pipe 36, and the check valve 37 into the engine manifold 34. If the engine be not running, air is evacuated from the brake cylinder into the reservoir chamber 90. The vacuum brake can therefore be applied even though the engine is not turning over. Air cannot be drawn into any part of the system other than the chamber 28 via the manifold 34 except through the valve 32, as the check valve 37 prevents back flow of air from the manifold into the pipe line 36. The evacuation of air from the chamber 20 eases the downward pressure on the valve 40 and allows the spring 65 to force it upward unless the pedal is held down to maintain a superior pressure on the compensator spring 66. The vacuum valve is thus self adjusting according to the degree of pressure applied manually via the pedal, and consequently light or medium braking can be effected through the pedal control, the valve operating automatically to check the eduction of air from the brake cylinder when the desired measure of brake pull has taken place. If the pedal be held hard down so that the valve 40 is positively held to the open position, then a complete evacuation of air from the brake cylinder up to the point corresponding with the degree of vacuum depression in the manifold or in the cylinder 90 will be obtained.

The valve 32 is a three-way valve. When the accelerator pedal 104 is let up so that the throttle 230 is closed or is open only sufficiently to pass the very limited flow of fuel mixture which is necessary for keeping the engine idling, the manifold 34 is in communication with the top chamber 28 of the valve casing 20 through the pipes 31 and 33 and the valve 32. When the accelerator pedal is depressed, a link 105 which connects it to the lever 231 of the valve 32 effects rotation of the valve 32, causing it to first close its casing port to which the pipe 33 is connected and immediately thereafter to open its casing port to which the by-pass pipe 35 is connected. The third port of the casing into which the pipe 31 is connected remains open under all circumstances. The opening up of the throttle 230 by the depressing of the accelerator pedal 104 results in the partial breaking of the vacuum in the engine manifold. The adjustment of the levers and links is so arranged that the pipe 33 is shut off as soon as the throttle position is reached at which the induction manifold depression falls too low to be satisfactory to effect braking with certainty. Thereafter, whilst the manifold depression is too low, the reservoir 90 is depended on to evacuate air from the brake cylinders. Immediately high vacuum is re-established in the manifold, any air which has been taken into the reservoir 90 is evacuated to the manifold through the pipe 36. The chamber 28 above the diaphragm 30 in the valve casing 20 is therefore always more or less exhausted of air, except when the accelerator pedal is free and the engine is not turning over, and consequently in all other circumstances the diaphragm 30 operates constantly against the loading spring 47 to lift the plunger 49 and free the crosshead 44 so that it may rise obediently to the upward pressure of the springs acting below it. When the engine stops, as by the cessation of the ignition current, vacuum is lost in the manifold 34 and consequently in the chamber 28; the spring 47 then acts to force down the plunger 49 and depress the crosshead 44 and thereby bring about the closing of the atmospheric valve 51 and the opening of the vacuum valve 40. The brake is thus applied automatically by action of the vacuum in the reservoir 90. The volume of air required to be evacuated from the chamber 28 and its connections to the manifold is too small to cause any inconvenience in the restarting of the engine. In all running conditions in which use of the air brake is likely to be called for, a high vacuum condition exists in the manifold 34. The driver is accustomed to release the accelerator pedal when application of brakes is necessary, and upon this release taking place with consequent closing of the throttle the vacuum in the manifold is accentuated, rising from a low point at which it stood previously whilst the engine was working on open throttle, to a high point at which it is maintained so long as the engine is turning over with the throttle held closed or nearly closed.

Whilst the engine is still turning over so that a high vacuum condition exists in the manifold 34, then the diaphragm 30 will be lifted against the contrary pressure of the spring 47, and in those circumstances the crosshead 48 will come to the up position, closing the vacuum valve 40 and opening the atmospheric valve 51, and the brake will thus be brought to the "off" position. It will be understood that if the transmission gear be left engaged and the vehicle is coasted down a hill with the throttle closed, whether or not the ignition be operating, a high vacuum will be maintained in the manifold 34, and this vacuum acting through the pipes 33 and 37 via the valve 32, will act on the diaphragm 30 to raise it. The vacuum brake will then be held off automatically and the driver must operate the pedal control 99 or 102 to apply the brake. If, however, the transmission gear be not engaged, then vacuum is lost in the manifold 34 and atmospheric pressure condition is established in the chamber 28. In those circumstances the spring 47 will force down the diaphragm 30, closing the atmospheric valve 51 and forcing open the vacuum valve 40, so that air is evacuated from the brake cylinder to the vacuum chamber 90. The brake is thus applied automatically under free running coasting conditions unless the control nut 50 is screwed up so as to withhold the spring 47 from pressing down the diaphragm 30. It is known that automatic application of a brake to a motor rail vehicle, service car, lorry, or the like, independently of the driver's will, is most desirable if coasting with the transmission gear in neutral be attempted. A vacuum brake on the system of this invention provides automatic means whereby under those circumstances it will become applied without any action on the part of the driver, unless the automatic function has been cancelled by screwing down the control nut 50; this nut may, of course, be locked so that right of interference with it is denied to the driver. Dangerous conditions arising in coasting with the engine inoperative are thus provided against, and descent of steep grades is therefore not attended with risks otherwise present in use. However, in coasting with the transmission gear disengaged, but with the engine still turning over, idling, a high vacuum condition is maintained in the manifold 34 and this vacuum acting through the pipe lines 33 and 37 and the valve 32 then raises the diaphragm 30 so allowing the brake to come off automatically. The driver must then be depended upon to operate the brake pedal to apply the brake. In the one case therefore with the engine stopped, which is the dangerous condition, braking takes place automatically, and in the other case, with the engine turning over, the driver has still his power of control on the braking system though the brakes will not apply themselves automatically. The capacity of the vacuum tank 90 is sufficient to adequately take care of all the braking necessary on a long steep grade. Evacuation of the tank 90 takes place continuously while the engine is turning over,—in other words so long as a condition of high vacuum is maintained in the manifold. A high degree of vacuum therefore always exists in the chamber 90, and the apparatus is therefore always ready to perform the braking operation. The check valve 37 prevents breaking of the vacuum by leakage of air back to the chamber 90 via the manifold 34.

A more compact form of the apparatus is shown in Fig. 4. The arrangement illustrated in this figure is such that the control valve may be mounted directly on the manifold. It is preferably mounted with its axis erect. 27 is the pipe leading to the brake cylinder and 36 the pipe leading to a reservoir fitted similarly to the reservoir 90, Fig. 1. The pipe 35 corresponds with the pipe similarly numbered in Fig. 1 and other identical letters of reference indicate corresponding parts in other portions of the Figure. The valve 32 is in this case controlled from an accelerator pedal 250 (see Fig. 4); this pedal is pulled off by a spring 251 and is depressed by the foot in the usual operation of driving the car. A linkage 252 shown diagrammatically, connects a crank arm on the pedal 250 through a lever 253 with the operating rod 254 which is connected to the lever 255 of the throttle 230 and also to the lever 231 of the valve 32. The functioning is the same as that described with reference to Fig. 1. Whilst the accelerator is up, the chamber 28 is in communication through the pipes 33 and 31 with the manifold 34. When the accelerator is down, the chamber 28 is in communication through the pipes 31 and 35 with the pipe 36 which leads to the vacuum reservoir 90. The diaphragm in the bottom of the chamber 28 operates upwardly against the head of the plunger 256 and a spring 47 in compression acts downwardly on the plunger 256. The plunger 256 passes through a bearing in the cover of the chamber 28 and externally of the chamber it is connected through a link 257, an oscillating lever 258, and another link 259, with the tubular stem portion 260 of the atmospheric valve. When the plunger 256 is moved outwardly, the atmospheric valve stem 260 is also moved outwardly in the opposite direction. Conversely, when the plunger 256 is moved inwardly by the spring 47 overpowering the upward pull on the diaphragm 30, the valve stem 260 is moved inwardly. The valve stem 260 is connected by a link 261 and a rod 262ᵃ to the brake pedal 262. When the brake pedal 262 is depressed the valve stem 260 is forced inward and in its inward movement translated through the members 259—258—257 forces the plunger 256 inward.

The pipe 36 is connected beyond the chamber valve 37 into the manifold 34 at 263. The brake air pipe 27 is connected into the lower chamber 264 of the combination valve. The other chamber 265 of the combination valve is connected as by the pipe 266 with the air pipe 36. The vacuum depression in the chamber 264 is indicated by a dial gauge (not shown); this dial gauge is fitted on the chamber 264 after the removal of a plug 267.

The vacuum valve 268 is a mitre faced poppet valve having a stem 269 working in a bearing in the casing. A helical spring 270 acts behind this valve to hold it on to its seat 271. Atmospheric depression in the chamber 265 operates to lift the valve 268 against the pressure of the spring 270. 273 is another helical spring acting under the vacuum valve 268 and bearing down on the seat 274 of the atmospheric valve. The stem portion 260 of the valve is tubular. It works through a stuffing box 275 and its top end has a mitre seat face 276 reamed in it and it is provided with a collar portion 277 which limits its outward movement. The seat 274 is a disc having a telescopic tubular stem 278 working within the tubular stem 260 of the valve; this tubular stem is ported laterally as shown at 279. The middle portion of the disc 274 is finished to a mitre face to coact with the seat 276 and its flange peripheral portion is perforated with a ring of fine holes 280. When the valve sleeve 260 is raised these holes are closed by the top collar end of the sleeve. When the valve sleeve 260 is moved outward, as shown in Fig. 5, clearance is established above its collar 277 so that air can pass freely through the tubular centre portion, the lateral holes 279, and the ring of holes 280. In those circumstances vacuum in the brake cylinder is broken as atmospheric air passes freely via the chamber 264 and the pipe 27 to the brake cylinder. When, however, the brake pedal 262 is depressed, the sleeve 260 is forced inward, bringing the valve collar face onto the valve seat and closing the ring of holes 280. Further inward movement of the atmospheric valve tensions the spring 273, and, as the movement continues, a point is reached at which the spring 273, assisted by the suction acting behind the vacuum valve 268, overpowers the spring 270, and the vacuum valve 268 then lifts. In those circumstances air is evacuated via the pipe 27 from the brake cylinder, the valve chamber 264, the valve chamber 265, the pipe 266, and the pipe 36; the evacuated air going either to the manifold at 263 or to the vacuum reservoir 90 (see Fig. 1). A condition of greater or less vacuum is thus established in the chamber 264, the corresponding vacuum existing in the chamber 265 is counterbalanced, and the vacuum valve 268 automatically comes to its seat. The measure of evacuation of air from the brake cylinder is consequently determined by the extent of the movement applied to the brake pedal. If the brake pedal be depressed sufficiently only to just raise the vacuum valve 268 then only a small portion of the air will be evacuated from the brake cylinder and only light braking pressure will be applied. If, however, the brake pedal be moved still further, the vacuum valve 268 will be held open for a longer time and a greater proportion of the air in the brake cylinder will be evacuated. By pressing and holding the pedal fully down, maximum braking can be effected. The operation of the valve is, therefore, automatic in that it is self regulating to hold only that degree of pressure on the brakes which corresponds with the degree of movement of the brake pedal effected by the movement of the driver's foot.

A sudden opening of the vacuum valve effected by a quick thrust on the brake lever is liable to allow a gush of air to pass into the manifold and affect the density of the fuel mixture, so that it fails to ignite, with the result that the engine is liable to be stalled. In order to prevent stalling of the engine in this way, provision is made for a momentary throttling of the air intake on the carburetter. This throttling may be effected by a direct linkage arrangement as indicated in Figs. 8 or 9, or by an automatic arrangement as indicated in Fig. 10. In the Fig. 8 arrangement the brake lever 262 is connected by a linkage system 290 with a hinge shutter 291 on the air intake mouth of the carburetter 292; this shutter is fitted with a gauze panel 293. When the brake pedal 262 is depressed, the shutter 291, which is otherwise open, is closed, with the result that the indraft of air which is forced to pass through the gauze covered aperture 293 is so throttled that a richer mixture is produced in the carburetter and this mixture will tolerate the dilution which results from the sudden inrush of air from the braking system in the manifold. Instead of a shutter 291 on the air inlet of the carburetter 292, the linkage system 290 may be connected to a damper throttle valve 294 in an extension pipe 295 fitted to the intake mouth of the carburetter 292; this shutter 294 is normally held open by a spring 296 and is more or less closed by operation of the linkage 290 only when the brake pedal 262 is depressed.

In the automatic arrangement indicated in Fig. 10, a hinge shutter 300, similar to the shutter 291 Fig. 8, is fitted similarly also with a gauze window 301, and is normally held open by a spring 302. A flexible diaphragm 303 on a chamber 304 is connected by a link 305 with the shutter 300 and the chamber 304 is connected by a pipe 306 to the brake suction pipe 27. In this case when air is evacuated from the brake cylinder through the pipe 27 a partial vacuum is established in the chamber 304, with the result that the diaphragm 303 is drawn in and the shutter 300 is momentarily closed, thereby throttling the intake of air to the carburetter. The pipe 307 on which the shutter 300 is fixed corresponds with the extension pipe 295, Fig. 9.

The intussuscepting diaphragm which is used in the various types of brake cylinders indicated respectively in Figs. 5, 6 and 7, is characterized in that the cylinder and the piston between which the diaphragm operates are both cylindrical, or substantially so. The annulus in which the diaphragm intussuscepts is therefore parallel sided and the clearance offered between the piston and the cylinder is only sufficient for the free flexing and folding of the diaphragm. The diaphragm may, therefore, be made of relatively thin and very flexible material as no considerable area of it is exposed to the atmospheric load when the back chamber of the cylinder is evacuated of air.

In the arrangement shown in Fig. 5, the cylinders are of differential size opened back to back into each other, the one 320 of larger diameter usually arranged for operating the rear wheel brake rod 321 and the other 322 of smaller diameter for operating the fore wheel brake rod 323. The pistons in both these cylinders are fitted with diaphragms of like type. The rim portions of the diaphragm are moulded in heavy ring section to fill ring seatings provided for them in the cylinder walls, and in the stub portion of the pistons respectively.

The arrangement of the single cylinder brake, Fig. 7, corresponds in substance with the construction of either one of the Fig. 5 double braking arrangements. In Fig. 6, the peripheral portion 325 of the diaphragm ring is clamped between the cover member 326 which is fixed to the front end of the cylinder 25 while the interior edge 327 of the diaphragm is sprung into a ring cavity of rectangular section in the inwardly flanged portion of the piston face 328.

What I claim as my invention and desire to secure by Letters Patent is:—

1. A vacuum brake comprising a valve casing having two chambers provided with a passage therebetween, a manually operable air admission valve in one of said chambers, a brake cylinder, a pipe connection from said chamber to said brake cylinder, a vacuum valve in the other of said chambers controlling the passage between them, said valves being arranged in axial alignment, air exhausting means, a pipe connection from said other chamber to said air exhausting means, a check valve in said last mentioned pipe connection, a spring bearing the vacuum valve onto its seat, and a spring under the vacuum valve arranged to be compressed in the closing movement of the air valve to force open the vacuum valve.

2. In a vacuum brake according to claim 1, and in combination therewith, a pneumatic valve controller, a three port valve, by-pass pipes leading from the valve for connecting the vacuum chamber in the valve casing with the pneumatic valve controller and with the air exhausting means, means dependent upon throttle movement for actuating said valve, and mechanism operated by said pneumatic controller for closing the air valve and opening the vacuum valve upon loss of vacuum in the air exhausting means.

3. In a vacuum brake adapted to be associated with an internal combustion engine, a brake cylinder, a valve casing, an air admission valve in said casing normally held open and connecting the brake cylinder with atmosphere, a vacuum valve, a spring normally holding the vacuum valve closed against vacuum which tends to lift it, and pneumatically controlled means for automatically closing said air admission valve and for subsequently opening said vacuum valve.

4. In a vacuum brake adapted to be associated with an internal combustion engine, a brake cylinder, a valve casing, an air admission valve in said casing normally held open and connecting the brake cylinder with atmosphere, a vacuum valve, a spring normally holding the vacuum valve closed against vacuum which tends to lift it, manually operable means and independently operable pneumatic action means for closing said air valve and for subsequently opening said vacuum valve.

5. In a vacuum brake according to claim 3 and in combination therewith, an accelerator for the engine, a valve associated with the accelerator of the engine for governing the pneumatically controlled means.

6. In a vacuum brake adapted to be associated with an internal combustion engine, an engine manifold, an accelerator for the engine, a brake cylinder, a valve casing, an air admission valve in said casing normally held open and connecting the brake cylinder with atmosphere, a vacuum valve, a spring normally holding the vacuum valve closed against vacuum which tends to lift it, a pneumatically controlled spring device, a governor valve actuated by the accelerator of the engine for admitting air to said device and means actuated by said device for automatically closing the air admission valve and for subsequently opening the vacuum valve when vacuum is lost in the engine manifold.

7. In a vacuum brake, the combination, an internal combustion engine, a manifold therefor, a vacuum reservoir, a brake cylinder, a valve casing, an air admission valve in said casing normally held open and connecting the brake cylinder with atmosphere, a vacuum valve normally held closed against vacuum which tends to lift it, a pneumatic valve controller, a three port valve, by-pass pipes connecting said controller with the vacuum reservoir and with the engine manifold through the three port valve, means dependent upon throttle movement for actuating said last mentioned valve, and mechanism operated by said pneumatic controller for closing said air admission valve and for subsequently opening said vacuum valve upon loss of vacuum in the engine manifold.

8. In a vacuum brake according to claim 3 and in combination therewith, an engine manifold, a vacuum reservoir, pipes connecting said reservoir with the engine manifold and with the vacuum valve and a valve adapted to admit air freely into said reservoir but to constrict the flow of air out of it.

9. In a vacuum brake adapted to be associated with an internal combustion engine, an air valve normally open, means for closing said valve, a vacuum valve, a spring for normally holding said vacuum valve closed against vacuum which tends to lift it, and another spring tensioned to open said vacuum valve after the air valve has been closed.

10. In a vacuum brake according to claim 3, an engine manifold, a vacuum reservoir and a vacuum valve casing pipe-connected to the engine manifold, and also to said reservoir.

In testimony whereof I affix my signature.

CHARLES VICTOR ROWELL.